(No Model.)
H. WAGNER.
ATTACHMENT FOR CORN PLANTERS.
No. 368,031. Patented Aug. 9, 1887.
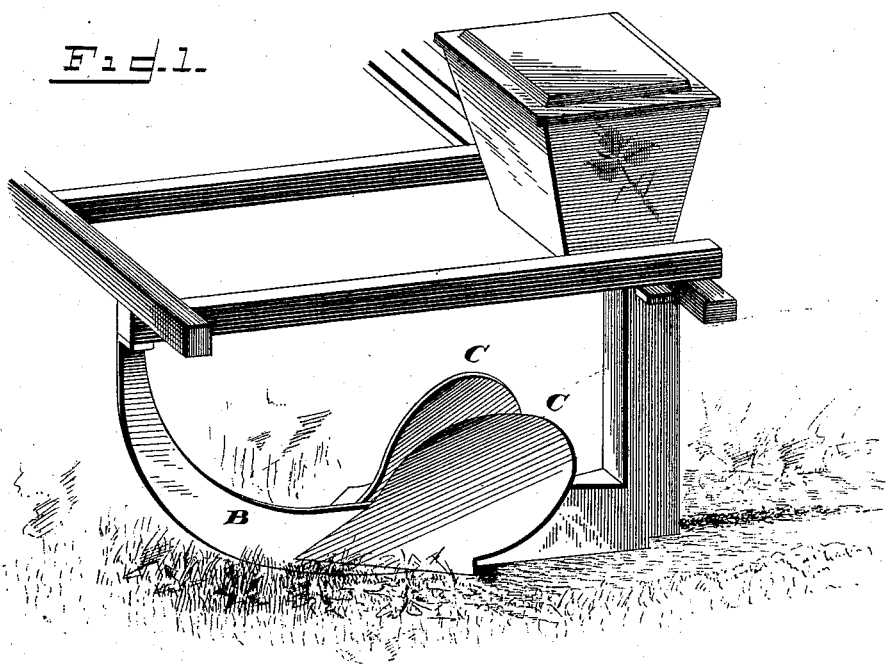
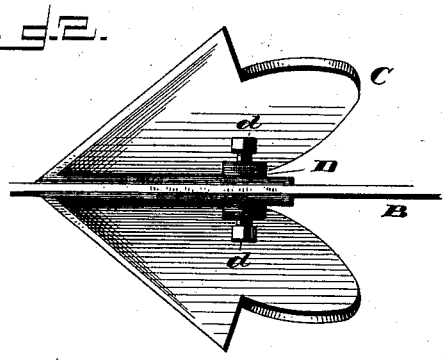
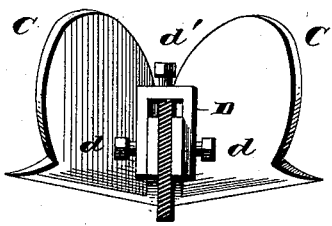
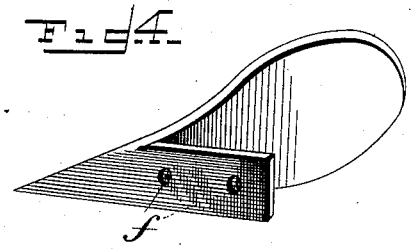
WITNESSES
G. S. Elliott
E. W. Johnson
Henry Wagner
INVENTOR
Attorney
N. PETERS, Photo-Lithographer, Washington, D. C.

UNITED STATES PATENT OFFICE.

HENRY WAGNER, OF GIRARD, KANSAS.

ATTACHMENT FOR CORN-PLANTERS.

SPECIFICATION forming part of Letters Patent No. 368,031, dated August 9, 1887.

Application filed April 28, 1887. Serial No. 236,450. (No model.)

*To all whom it may concern:*

Be it known that I, HENRY WAGNER, a citizen of the United States of America, residing at Girard, in the county of Crawford and State of Kansas, have invented certain new and useful Improvements in Attachments for Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in attachments for corn-planters, the object being to provide the runners of a corn-planter with plowshares which are adjustable upon said runners, so that the ground will be cultivated on each side of the runner before the seed drops into the furrow made by the runner; and with the above object in view my invention consists in providing the runners of corn-planters with adjustable shares which are located on each side of said runners, so as to throw the earth in opposite direction, as will be hereinafter fully set forth, and specifically pointed out in the claims.

In the accompanying drawings, which illustrate my invention, Figure 1 is a perspective view of a runner of a corn-planter, showing my improvement applied thereto. Fig. 2 is a bottom view. Fig. 3 is a rear view, partly in section; and Fig. 4 is a detail perspective view.

A refers to a portion of a corn-planter of ordinary construction, B being the runner thereof, to which my improvement is attached by means of suitable clamps and bolts.

C C refer to the plowshares, one being adapted to throw the furrow to the right, while the other throws to the left, the landsides of these shares being rigidly attached or formed integral, and they may be provided with bolt-holes for adjustably attaching the same to the horizontal portion of the runner in front of the heel, so that the lower edges will occupy a position slightly above said runners, the distance between the bottom of the runner and the lower edge of the shares being determined by the condition of the ground, which has been previously cultivated in the usual manner prior to planting. By providing the runner with plowshares all weeds, trash, or other foreign substances will be thrown on each side of the runner and the ground will be cleared and leveled on each side of the furrow made by the runner in which the seed falls, so that the coverer of the corn-planter will more effectively do its work.

C refers to the plowshares, which are attached on each side of the runner B by means of a U-shaped clamp, D, which clamp is provided with bolts $d\ d$ at its sides and with a bolt, $d'$, which bears upon the upper edge of the runner, and by means of which the vertical position of the shares with respect to the runner may be adjusted. Either one or more clamps D may be employed, or instead of clamps, as shown in the accompanying drawings, I may employ bolts, which can be passed through perforations $f$, as shown in Fig. 4, and through perforations in the runner.

When, owing to the condition of the soil, it is not desired to use or employ the shares C C, they can be readily detached.

I claim—

1. The combination, with the runner of a corn-planter, of the shares having fixed landsides, the U-shaped clamp, and bolts $d$, passing through perforations in the clamp and landsides, substantially as described.

2. The combination, with the runner, of the shares having fixed perforated landsides, U-shaped clamp, and bolts $d\ d$ and $d'$, whereby the shares may be adjusted both horizontally and vertically upon the runner, substantially as described.

In testimony whereof I affix my signature in presence of two witnesses.

HENRY WAGNER.

Witnesses:
N. R. COLE,
E. VANSYCKEL.